United States Patent
Park et al.

(10) Patent No.: US 7,340,170 B2
(45) Date of Patent: Mar. 4, 2008

(54) WAVELENGTH-DIVISION MULTIPLEXED SELF-HEALING PASSIVE OPTICAL NETWORK

(75) Inventors: Sung-Bum Park, Suwon-si (KR); Yun-Je Oh, Yongin-si (KR); Seong-Taek Hwang, Pyeongtaek-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 555 days.

(21) Appl. No.: 10/939,790

(22) Filed: Sep. 13, 2004

(65) Prior Publication Data

US 2005/0141892 A1 Jun. 30, 2005

(30) Foreign Application Priority Data

Dec. 31, 2003 (KR) .................... 10-2003-0101644

(51) Int. Cl.
*H04J 14/00* (2006.01)
*H04B 10/08* (2006.01)

(52) U.S. Cl. .................... 398/67; 398/68; 398/70; 398/72; 398/5; 398/14; 398/20; 398/21; 398/33

(58) Field of Classification Search .......... 398/5–7, 398/9, 10, 13, 14, 16, 20, 21, 30–33, 66–68, 398/70–72

See application file for complete search history.

(56) References Cited

U.S. PATENT DOCUMENTS 5,907,417 A * 5/1999 Darcie et al. .............. 398/20
2003/0081279 A1* 5/2003 Uchino .................. 359/110

FOREIGN PATENT DOCUMENTS

| JP | 11-017658   | 1/1999  |
|----|-------------|---------|
| JP | 11-127121   | 5/1999  |
| JP | 2001-358697 | 12/2001 |
| JP | 2002-141927 | 5/2002  |
| JP | 2002-520946 | 7/2002  |

* cited by examiner

Primary Examiner—Dalzid Singh
(74) Attorney, Agent, or Firm—Cha & Reiter, LLC

(57) ABSTRACT

A wavelength-division multiplexed self-healing passive optical network is capable of detecting cut-off and deterioration of feeder fiber and distribution fiber and restoring a network with a star structure. The network includes a central office, a remote node, and a plurality of subscriber units. Working and protection feeder fibers connect the central office to the remote node. A reflection unit at an end of the remote node connects to the central office for reflecting a monitoring optical signal transmitted from the central office. An output monitor stage at an end of the central office connects to the remote node for detecting the reflected monitoring optical signal and generating a control signal based on the presence of abnormality of the working and protection feeder fibers.

20 Claims, 10 Drawing Sheets

US 7,340,170 B2

WAVELENGTH-DIVISION MULTIPLEXED SELF-HEALING PASSIVE OPTICAL NETWORK

CLAIM OF PRIORITY

This application claims priority to an application entitled "WAVELENGTH-DIVISION MULTIPLEXED SELF-HEALING PASSIVE OPTICAL NETWORK," filed in the Korean Intellectual Property Office on Dec. 31, 2003 and assigned Ser. No. 2003-101644, the contents of which are hereby incorporated by reference.

BACKGROUND OF THE INVENTION

1. Field of the Invention

The present invention relates to a wavelength-division multiplexed self-healing passive optical network, which is capable of detecting cut-off and deterioration of feeder fiber and distribution fiber and restoring the network.

2. Description of the Related Art

A wavelength-division multiplexed (WDM) passive optical network (PON) can be configured to provide secure, secret communication. The communication capacity can be enlarged as required by subscribers. In addition, the number of subscribers can be increased by increasing the number of wavelengths to be allocated to new subscribers.

In general, the wavelength-division multiplexed passive optical network uses a double star structure where a central office (CO) is connected up to remote nodes (RN) installed in the neighbor areas of subscribers by means of one feeder fiber and the neighbor areas are connected up to the subscribers by means of individual distribution fibers.

Multiplexed downstream signals are transmitted to the remote nodes through one feeder fiber, de-multiplexed by multiplexers/de-multiplexers located at the remote nodes, and then transmitted to the subscribers through the distribution fibers connected individually to the subscriber units.

Upstream signals output from the subscriber units are transmitted to the remote nodes through the distribution fibers connected individually to the subscriber units, multiplexed by multiplexers/de-multiplexers located at the remote nodes, and then transmitted to the central office.

In such a wavelength division multiplexed passive optical network, however, if unexpected accidents such as cut-off and deterioration of the feeder fiber or distribution fibers take place, this may result in loss of a mass of transmitted data even if the term of the accidents is shortened. Therefore, to minimize such a loss, the accidents are quickly detected so that the feeder fiber or distribution fibers are quickly restored.

So, there is a keen need for a wavelength division multiplexed self-healing passive optical network, which is capable of detecting accidents such as cut-off and deterioration of the feeder fiber or distribution fibers on an implemented optical network and restoring the optical network.

FIGS. 1a and 1b show examples of a conventional wavelength division multiplexed self-healing ring network.

In general, a ring network in which nodes are connected together in the form of a ring is used as the topology for restoring a wavelength division multiplexed optical network smoothly when an accident such as cut-off of a fiber takes place.

In such a conventional ring network, a central office 100, remote node 1 (denoted "remote node 200") and remote node 2 (denoted "remote node 300") are connected together by two fibers which comprise a composite feeder fiber.

The two fibers consist of a working fiber and a protection fiber. In the normal state, the central office 100 multiplexes by means of its components 101, 102, 103 signals having various wavelengths (for example, λ1 and λ2) to form two identical optical signals and transmits each signal over the respective one of the two fibers. Unidirectional add/drop multiplexer 108, 109, 112, 113 selectively drops an incoming optical signal to the respective one of the optical switching devices 110, 111, 114, 115 and replaces the dropped signal by adding from that switching device another signal having the same wavelength(s).

Similarly, remote node 200, 300 transmits the same two optical signals over respective ones of the two fibers to the central office 100 which de-multiplexes incoming optical signals by means of de-multiplexers 106, 107. Likewise, selection from among the two optical signals is made using optical switching devices 104, 105. When an accident takes place such as cut-off of the working fiber, as shown in FIG. 1b, the conventional ring network performs a self-healing operation as follows. Assuming, for example, that the working fiber of the composite feeder fiber between remote nodes 200, 300 is cut off, since remote node 300 cannot receive channel 2 (λ2) traveling counterclockwise over the working fiber, it receives channel 2 (i.e., λ2) traveling clockwise over the protection fiber. In addition, since remote node 200 cannot add and transmit channel 1 (λ1) in the counterclockwise direction over the working fiber, it transmits channel 1 (λ1) in the clockwise direction over the protection fiber by switching the optical switching device 110. In this way, the conventional ring network is capable of healing the accident occurring in the network.

Although it is efficient to use the conventional self-healing ring network when the central office is distant from a plurality of remote nodes to some degree (several tens of km), a structure of the ring network is not suitable for a passive optical network where the central office is connected in close proximity to the remote nodes and the remote nodes are connected to each other. Namely, since the passive optical network commonly has a star structure, there is a need for a new self-healing method different from the self-healing method for the ring network.

SUMMARY OF THE INVENTION

The present invention has been made in view of the above problems, and it is an object of the present invention to provide a bi-directional wavelength-division multiplexed self-healing passive optical network, which is capable of detecting accidents such as cut-off and deterioration of feeder fiber and distribution fiber in an optical network with a star structure and restoring the network.

BRIEF DESCRIPTION OF THE DRAWINGS

The above features and other advantages of the present invention will be more clearly understood from the following detailed description taken in conjunction with the accompanying drawings, in which the same or similar elements are denoted by the same reference numerals throughout the several views.

DETAILED DESCRIPTION

To accomplish the object of the present invention, a wavelength-division multiplexed passive optical network including a central office, a remote node, and a plurality of subscriber units, includes working and protection feeder fibers for connecting the central office to the remote node. A reflection unit provided at an end of the remote node connects to the central office for reflecting a monitoring optical signal transmitted from the central office. An output monitor stage provided at an end of the central office connects to the remote node for detecting the reflected monitoring optical signal and generating a control signal based on the presence of an abnormality of the working and protection feeder fibers. A first optical switch switches the working and protection feeder fibers based on the control signal generated in the output monitor stage.

Preferred embodiments of the present invention are described in detail with reference to the annexed drawings. In the following description, details of known functions and configurations incorporated herein are omitted for clarity of presentation.

Figure 1A:
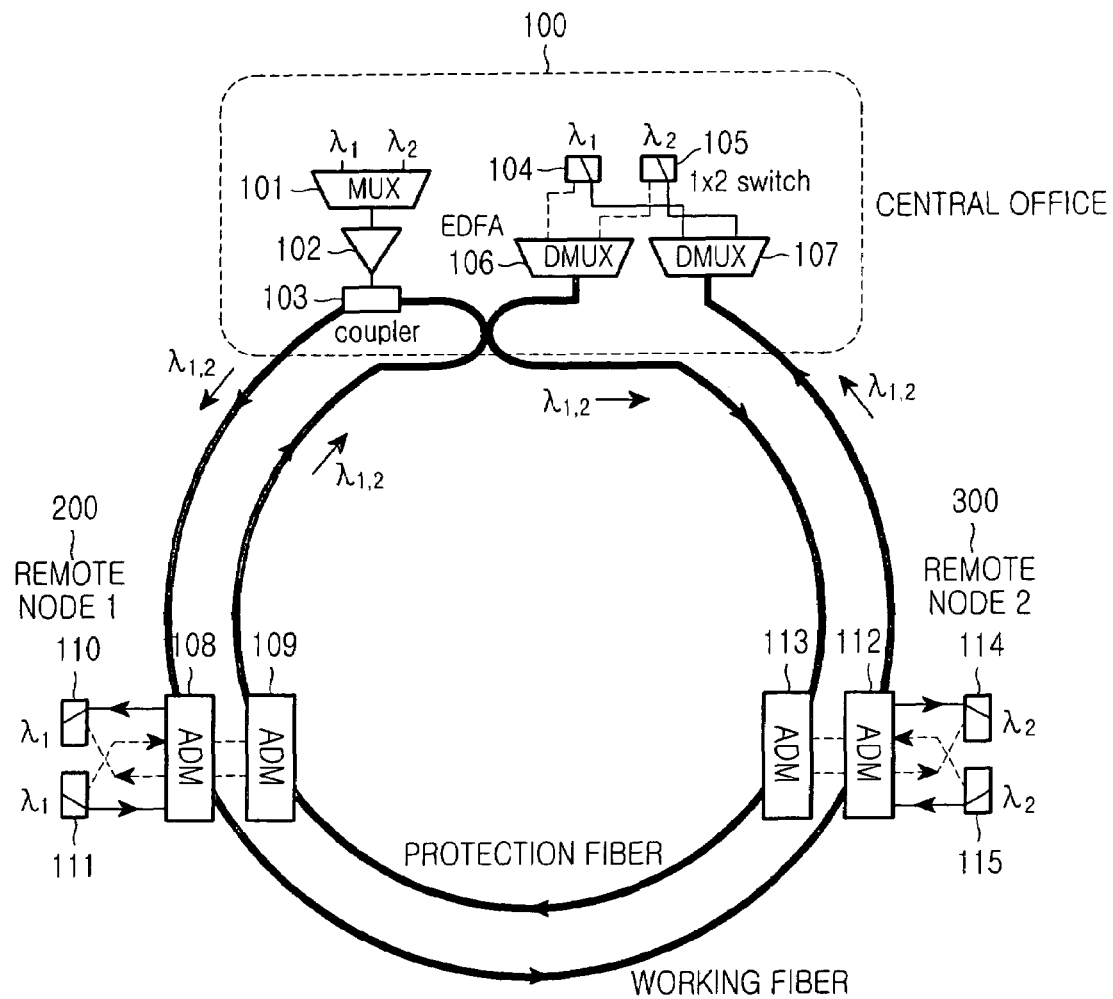
FIGS. 1a and 1b are views showing a conventional wavelength-division multiplexed self-healing ring network.
Figure 1B:
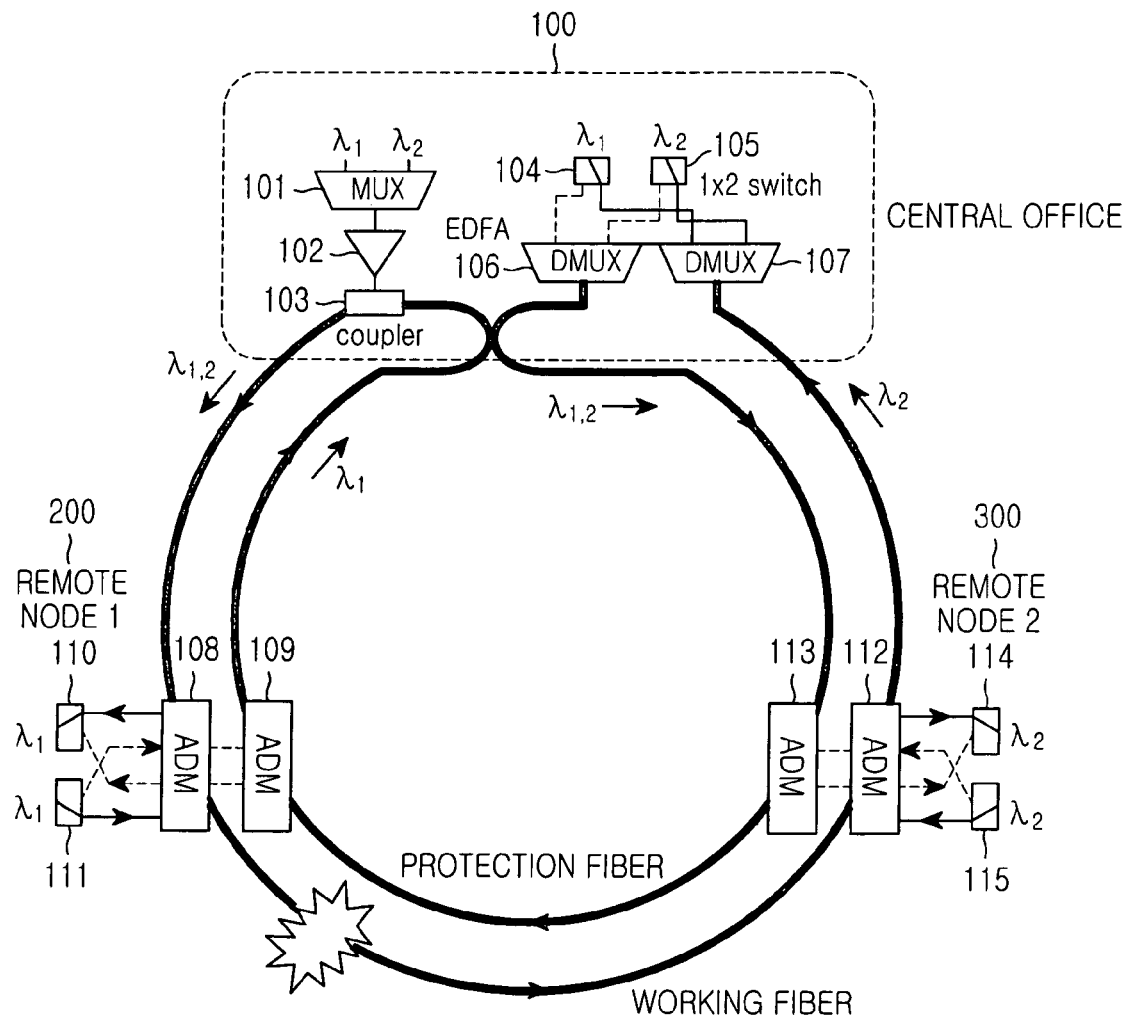
Figure 2:
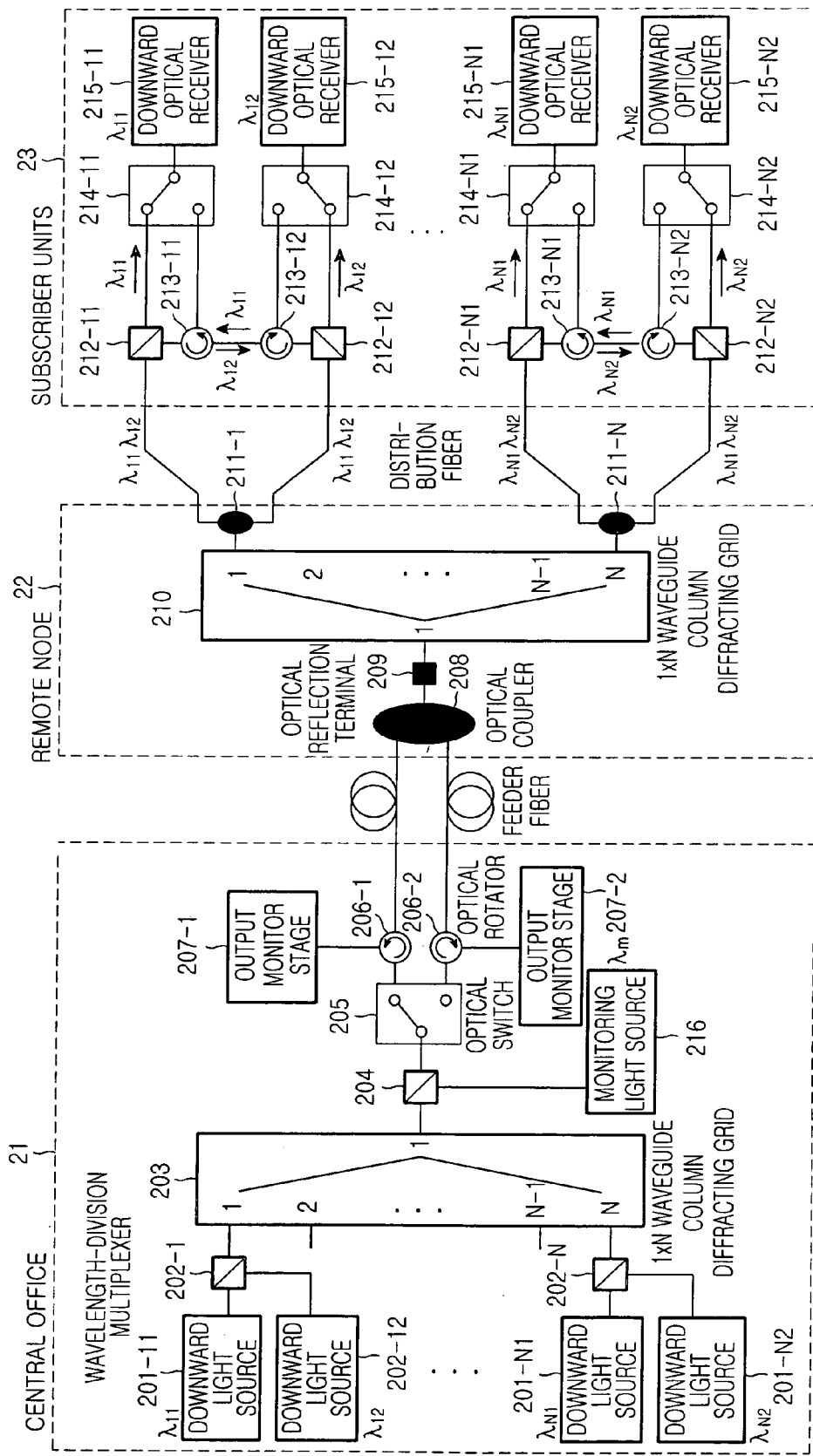
FIG. 2 is a view illustrating downstream signal transmission in a wavelength-division multiplexed self-healing passive optical network in accordance with the present invention.

FIG. 2 shows, by way of illustrative and non-limitative example, downstream signal transmission in a wavelength-division multiplexed self-healing passive optical network in accordance with the present invention, which generally includes a central office 21, a remote node 22 and 2N subscriber units 23.

The central office 21 includes an N×1 arrayed waveguide grating (multiplexer) 203, two groups 201-11 to 201-N1, 201-12 to 201-N2 (hereinafter "groups 201-11 to 201-N2") of downstream light sources, which are separated from each other by a free spectral range of the N×1 arrayed waveguide grating (multiplexer) 203, and wavelength-division multiplexers 202-1 to 202-N each coupling together a respective light source of the two groups. The central office 21 also features a monitoring light source 216 for monitoring a possible accident in the network, a wavelength-division multiplexer 204 for coupling the monitoring light source with a multiplexed downstream light source, a 1×2 optical switching device 205 for switching between a working feeder fiber and a protection feeder fiber. Each of the latter fibers connects the central office 21 to the remote node 22. The central office 21 also has monitoring optical circulators 206-1 and 206-2 for monitoring output of downstream signals, output monitor stages 207-1 and 207-2 for monitoring cut-off of the feeder fiber, and a 2×1 optical coupler 208 for coupling the piece of working feeder fiber with the piece of protection feeder fiber. The remote node 22 includes a 1×N arrayed waveguide grating (de-multiplexer) 210 for de-multiplexing downstream light sources for each wavelength of subscribers, an optical reflection terminal 209 for reflecting a monitoring light source, and 1×2 optical couplers 211-1 to 211-N each for copying a respective output from the 1×N arrayed waveguide grating (de-multiplexer) 210 to produce two identical outputs. The remote node 22 further has a piece of distribution fiber connecting the remote node 22 to each subscriber unit 23. A piece of protection fiber connects adjacent subscriber units of a pair to each other.

The subscriber units 23 include downstream optical receivers 215-11 to 215-N2, wavelength-division de-multiplexers 212-11 to 212-N2 for branching between two optical signal channels, which are separated by the free spectral range of the 1×N multiplexer and allocated to each of two subscriber units connected together by the protection fiber. Also included in the subscriber units 23 are optical circulators 213-11 to 213-N2, and 1×2 optical switching devices 214-11 to 214-N2.

The wavelength-division multiplexed self-healing passive optical network as constructed above in accordance with the present invention performs two self-healing operations for the downstream signal. One is for the downstream signal from the central office 21 to the remote node 22 and the other for the downstream signal from the remote node 22 to each of the subscriber units 23. In this embodiment of the present invention, although the two operations are shown in the same figure, they may be shown in separate figures. Namely, in view of description of the embodiment of the present invention, it is apparent to those skilled in the art that the two self-healing operations for the downstream signal from the central office 21 to the remote node 22 and from the remote node 22 to each of the subscriber units 23 can be provided separately.

Figure 3:
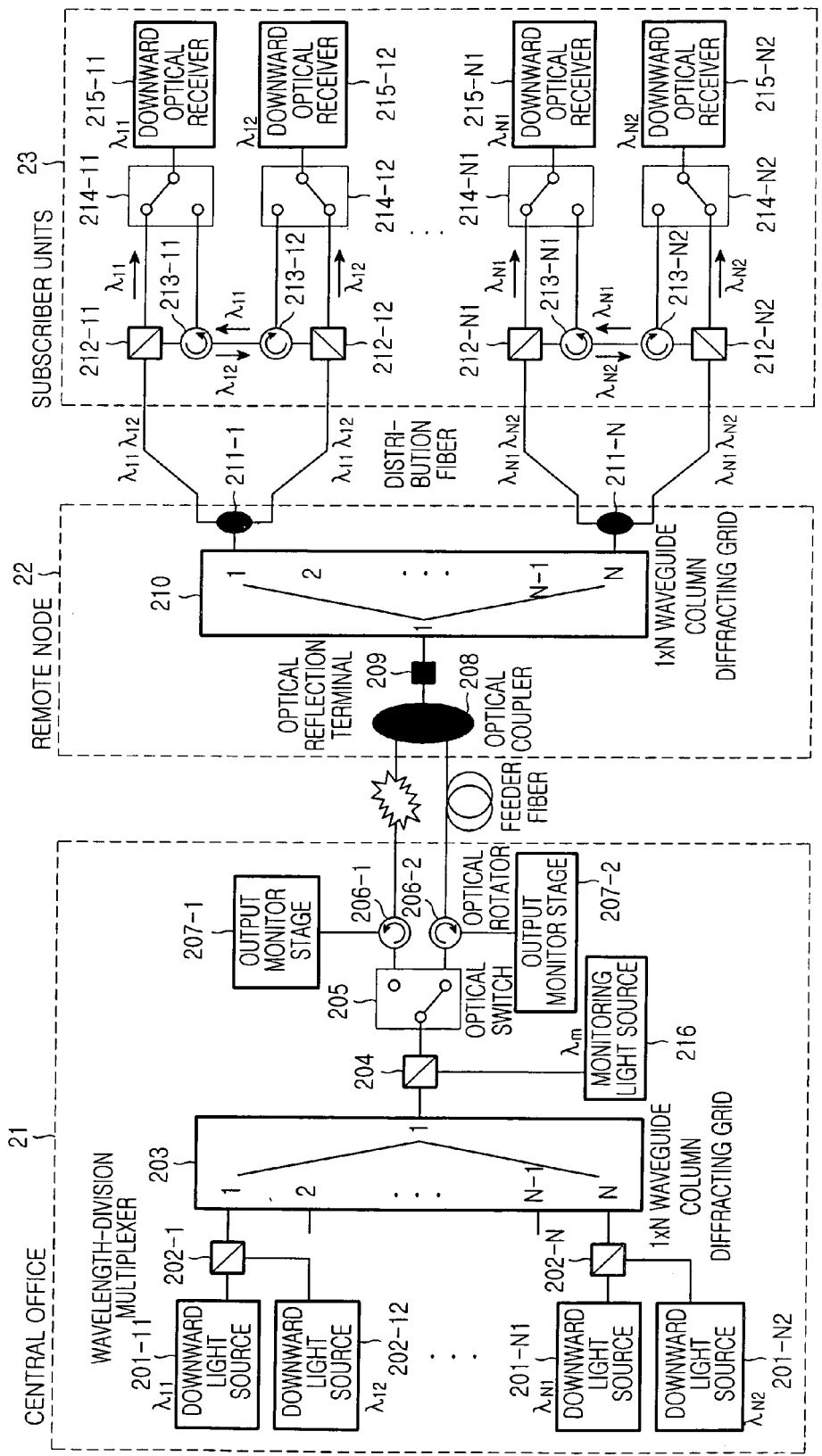
FIG. 3 is a view illustrating a first embodiment of self-healing in the downstream signal transmission of the wavelength-division multiplexed self-healing passive optical network in accordance with the present invention.

FIG. 3 shows a cut-off or other abnormality in the working fiber of the feeder fiber between the central office 21 and the remote node 22, to demonstrate a self-healing operation for the downstream signal from the central office to the remote node. As shown in FIG. 3, an optical signal to be transmitted to the remote node 22 is coupled with light emitted from the monitoring light source 216 and is then transmitted through the optical switching device 205. Next, the optical signal is transmitted through the optical circulator 206-1 over the feeder fiber to the optical coupler 208 of the remote node 22. The optical signal output from the optical coupler 208 is reflected at the optical reflection terminal 209 and then transmitted through the optical circulator 206-1 over the feeder fiber to the output monitor stage 207-1 for checking the presence of abnormality of the feeder fiber. In this case, if abnormality of the working feeder fiber is present, the optical switch 205 is controlled to transmit the optical signal through the protection fiber. If the working feeder fiber is repaired, and abnormality is detected in the protection feeder fiber, it is within the intended scope of the invention to automatically switch signaling back to the working feeder fiber. Moreover, in addition to the working feeder fiber, two protection feeder fibers may be provided, so that abnormality in one of the two causes switching to the other of the two.

Figure 4:
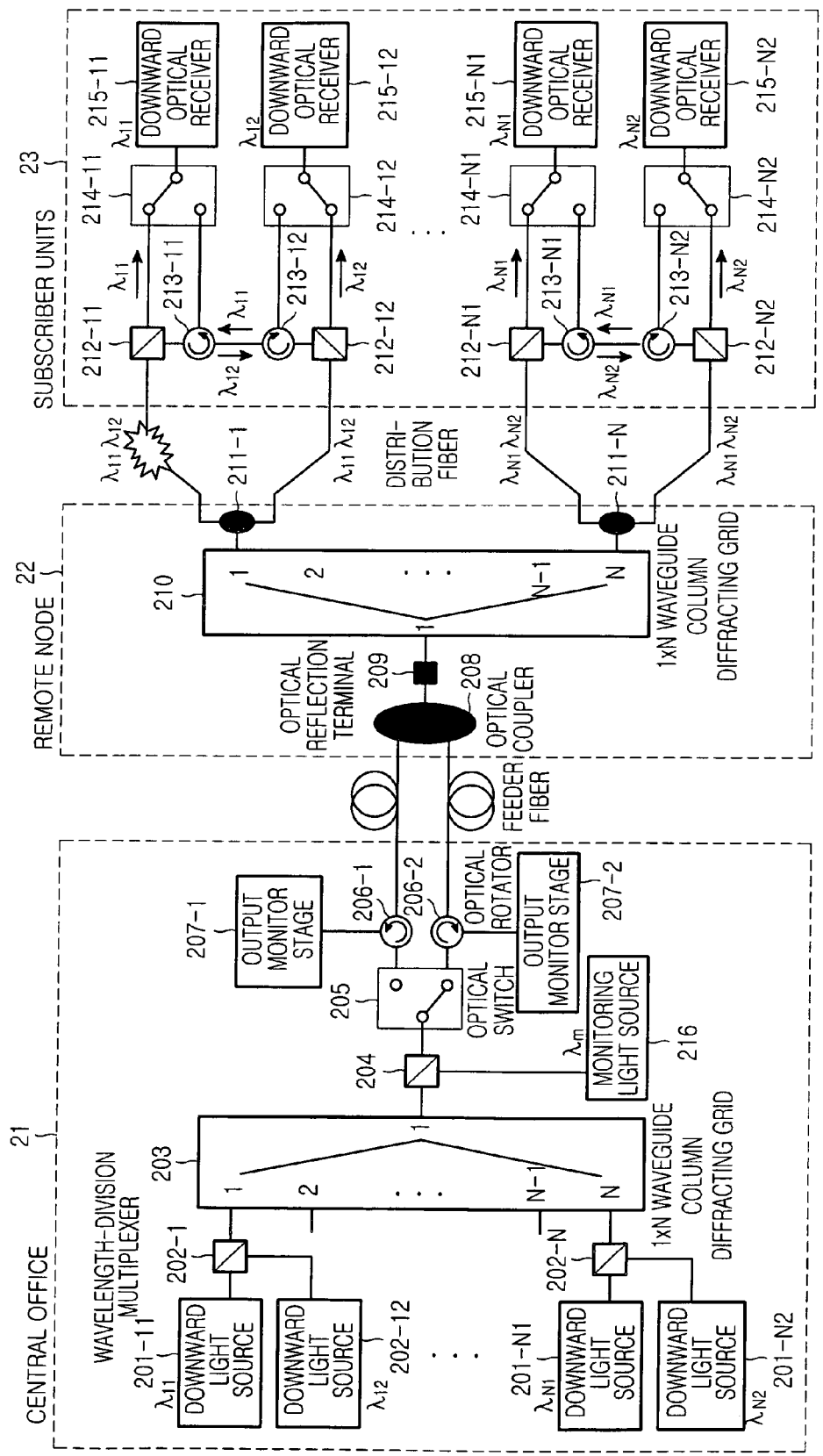
FIG. 4 is a view illustrating a second embodiment of self-healing in the downstream signal transmission of the wavelength-division multiplexed self-healing passive optical network in accordance with the present invention.

Now, the self-healing operation for the downstream signal from the remote node 22 to each of the subscriber units 23 will be described by way of the downstream light sources 201-11 and 201-12 with reference to FIG. 4. In FIG. 4, the abnormality is shown, instead, to occur in one of the distribution fibers from the remote node 22 to the subscriber units 23.

Figure 5:
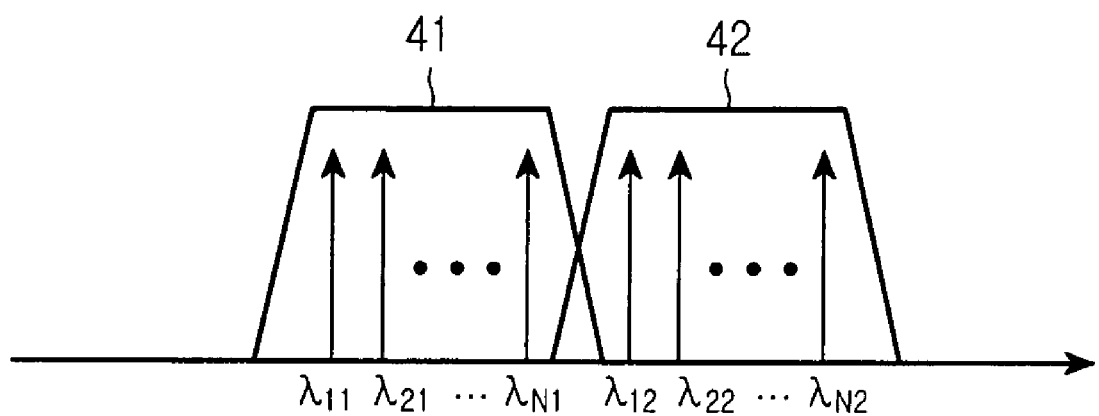
FIG. 5 is a diagram showing an example of a spectrum of two groups of wavelength-division multiplexed optical signals, which are separated from each other by a free spectral range of an arrayed waveguide grating in accordance with the present invention.
Figure 6:
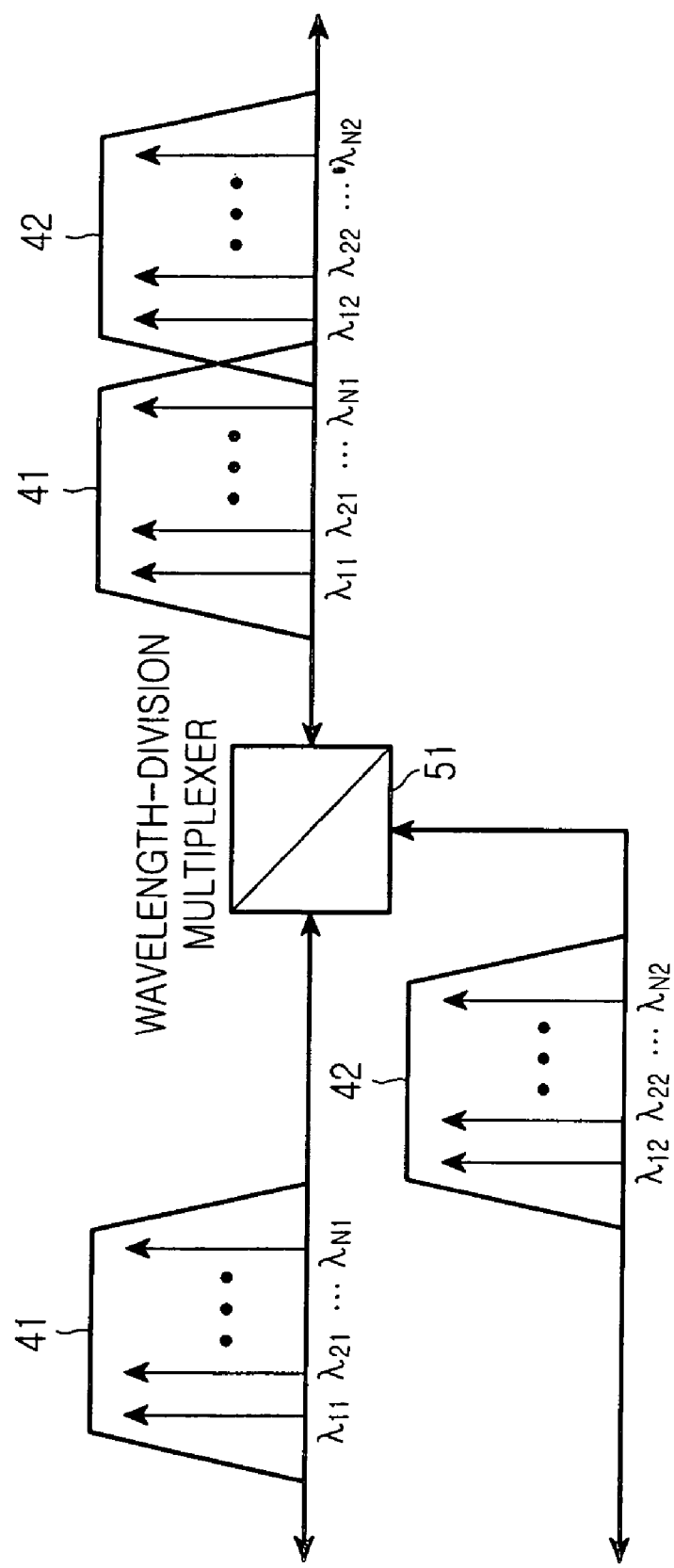
FIG. 6 is a diagram showing an example of a pass spectrum of a wavelength-division multiplexer for adding/dropping the optical signal in FIG. 5.

As shown in FIG. 4, two groups of downstream light sources ($\lambda i1$, $\lambda i2$), which are separated from each other by the free spectral range of the N×1 multiplexer 203 of the central office 21, are combined by the wavelength-division multiplexer 202-1. The combined signal is multiplexed once more by the N×1 multiplexer 203. The two downstream light sources ($\lambda 11$, $\lambda 12$), which are separated from each other by the free spectral range of the N×1 multiplexer 203, are spectrally disposed as shown in FIG. 5. Namely, the two groups of downstream light sources are classified into a first group of wavelengths 41 consisting of $\lambda 11$, $\lambda 21$, . . . , $\lambda N1$ and a second group of wavelengths 42 consisting $\lambda 12$, $\lambda 22$, . . . , $\lambda N2$. The two groups of wavelengths 41 and 42 are, as seen in FIG. 6, multiplexed or demultiplexed in a wavelength-division multiplexer 51 that conceptually corresponds to the remote node 22 and part of the central office 21, as indicated by reference numerals 202-1 to 202-N or 212-11 to 212-N2 in FIG. 2.

The multiplexed downstream light sources are transmitted to the remote node 22 through the 1×2 optical switch 205 via the working fiber connecting the central office 21 and the remote node.

In remote node 22, the transmitted multiplexed downstream light sources are de-multiplexed by the 1×N de-multiplexer 210, which has N ports connected respectively to N 1×2 optical couplers 211-1 to 211-N, which in turn are connected respectively to 2N subscriber units. Two subscriber units connected respectively to both terminals of one optical coupler 211-1, for example, simultaneously receive two optical signals $\lambda 11$ and $\lambda 12$, which are separated from each other by the free spectral range of the N×1 multiplexer 203 and uses the 1×2 wavelength-division de-multiplexers 212-11, 212-12 to select only the light source allocated to the respective subscriber. For example, first and second subscriber units receive simultaneously through the distribution fiber a $\lambda 11$ optical signal and a $\lambda 12$ optical signal. Next, using the 1×2 wavelength-division de-multiplexers 212-11 and 212-12, the first subscriber unit selects the $\lambda 11$ optical signal and the second subscriber unit selects the $\lambda 12$ optical signal. When an accident takes place in the distribution fiber connecting two subscriber units, optical circulators 213-11, 213-12, the 2×1 optical switches 214-11, 214-12 and the protection fiber connected between two subscriber units, are used to protect the optical signals and restore the network.

Specifically, in the normal state, the 1×2 wavelength-division de-multiplexers 212-11, 212-12 an incoming optical signal into the $\lambda 11$ optical signal and the $\lambda 12$ optical signal, which are in turn received to the respective downstream optical receivers. Unnecessary optical signals, which have not been received by the downstream optical receivers, are transmitted through the optical circulators 213-11 and 213-12 to the optical switches 214-11 and 214-12 and are extinguished (because the optical switches are in the open state).

However, when the accident takes place in the distribution fiber between the optical coupler 211-1 and the wavelength-division de-multiplexer 212-11 as shown in FIG. 4, the $\lambda 11$ cannot be transmitted to the downstream optical receiver 215-11 in the normal way. In this case, the $\lambda 11$ optical signal separated through the wavelength-division de-multiplexer 212-12 is transmitted via the optical circulator 213-11 to the optical switch 214-11. The latter switches to connect to the protection fiber upon detecting that the $\lambda 11$ optical signal is not transmitted through the wavelength-division de-multiplexer 212-11, thereby providing a path for the $\lambda 11$ optical signal.

Figure 7:
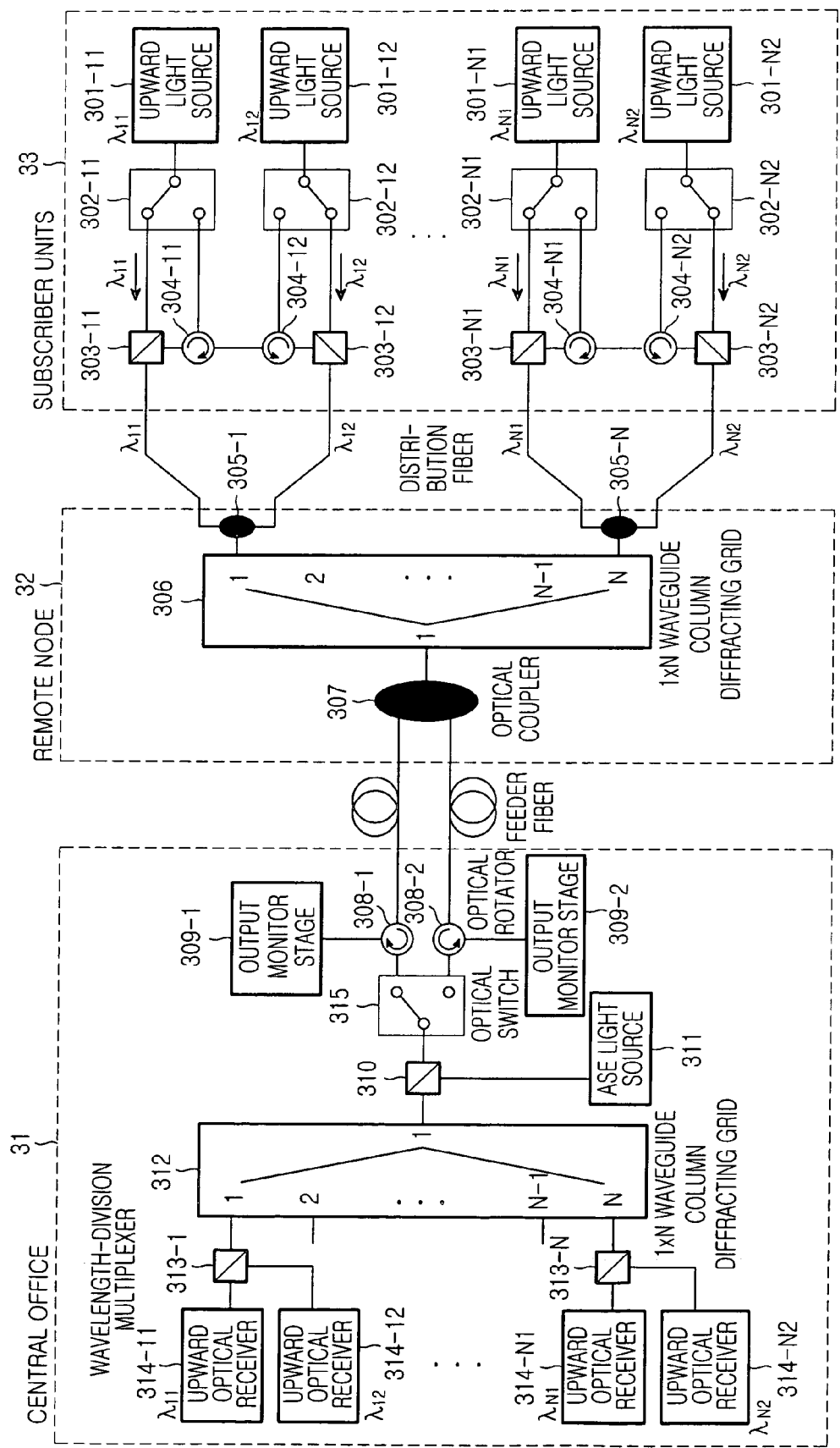
FIG. 7 is a view illustrating upstream signal transmission in a wavelength-division multiplexed self-healing passive optical network in accordance with the present invention.

FIG. 7 is a view illustrating upstream signal transmission in the wavelength-division multiplexed self-healing passive optical network, in accordance with the present invention, that generally includes a central office 31, a remote node 32 and 2N subscriber units 33.

The central office 31 includes an 1×N arrayed waveguide grating (de-multiplexer) 312, wavelength-division de-multiplexers 313-1 to 313-N each for separating an upstream optical signal, formed by a coupling of two adjacent light sources, into an optical signal for each wavelength. Further included in the central office 31 are upstream optical receivers 314-11 to 314-N2 for receiving the optical signal for each wavelength from the wavelength-division de-multiplexers 313-1 to 313-N, an ASE (Amplified Spontaneous Emission) light source 311 with a wide bandwidth used to monitor the fiber state, and output monitor stages 309-1, 309-2 for monitoring cut-off of a feeder fiber. The central office 31 also features an optical switch 315 for selecting one of a working feeder fiber and a protection feeder fiber, each connecting the central office 31 and the remote node 32. An optical coupler 308-1 and 308-2 transmits to the output monitor stages 309-1, 309-2 a signal for monitoring the upstream optical signal. The central office 31 further includes a wavelength-division multiplexer 310 for coupling the upstream optical signal with the ASE light source 311.

The remote node 32 includes a N×1 multiplexer 306, a 1×2 optical coupler 307, and a working distribution fiber connecting the remote node 32 to each of the subscriber units 33. A protection distribution fiber connects adjacent subscriber units of a pair to each other.

The subscriber units 33 include upstream light sources 301-11 to 301-N2, wavelength-division multiplexers 303-11 to 303-N2 for coupling the upstream light sources. The upstream light sources 301-11 to 301-N2 are allocated respectively to the 2N subscriber units 33 connected together pair-wise by the protection distribution fiber, the units of a pair being separated by the free spectral range of the 1×N multiplexers 312, 306. The subscriber units 33 further comprise optical circulators 304-11 to 304-N2, and 1×2 optical switches 302-11 to 302-N2.

The wavelength-division multiplexed self-healing passive optical network as constructed above in accordance with the present invention performs two self-healing operations for the upstream signal. One is for the remote node to central office path and the other for the subscriber unit to remote node path. In this embodiment of the present invention, although the two operations are shown in the same figure, they may be shown in separate figures. Namely, in view of the description of the embodiment of the present invention, it is apparent to those skilled in the art that the two self-healing operations for the upstream signal from the remote node 32 to the central office 31 and from each subscriber unit 33 to the remote node 32 can be provided separately.

Figure 8:
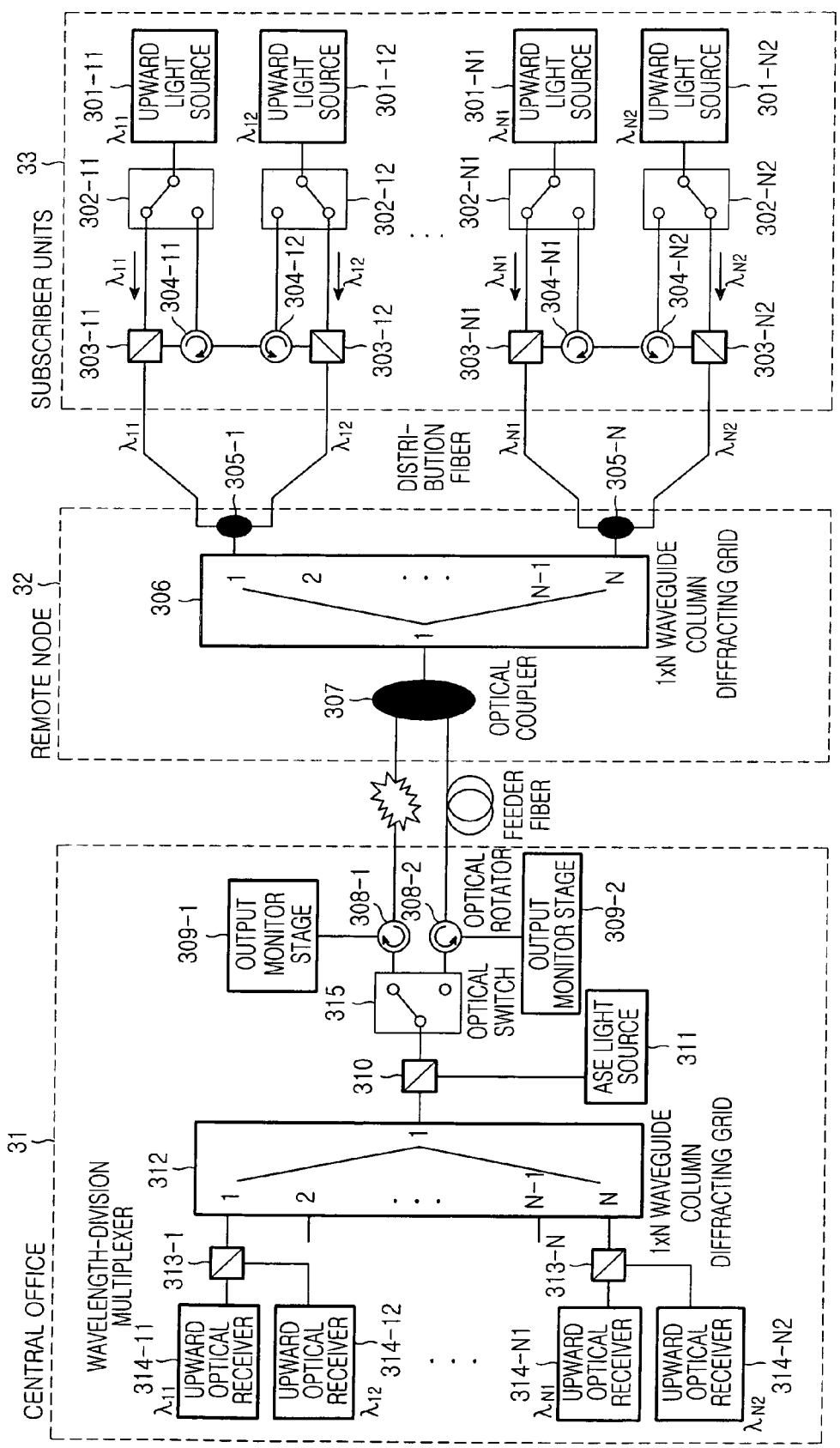
FIG. 8 is a view illustrating a first embodiment of self-healing in the upstream signal transmission of the wavelength-division multiplexed self-healing passive optical network in accordance with the present invention.

FIG. 8 shows the self-healing operation for the upstream optical signal from the remote node 32 to the central office 31. As shown in FIG. 8, the presence of an accident such as cut-off of the working feeder fiber can b e detected by the presence of upstream optical signal by using the monitoring optical coupler and the monitoring output terminal. Upon detecting the cut-off of the working feeder fiber, the central office 31 changes the state of the 2×1 optical switch 315 to receive the upstream optical signal via the protection feeder fiber.

Now, the self-healing operation for the upstream optical signal from each subscriber unit 33 to the remote node 32 will be described by way of the upstream light sources 301-11 and 301-12 with reference to FIG. 9.

Figure 9:
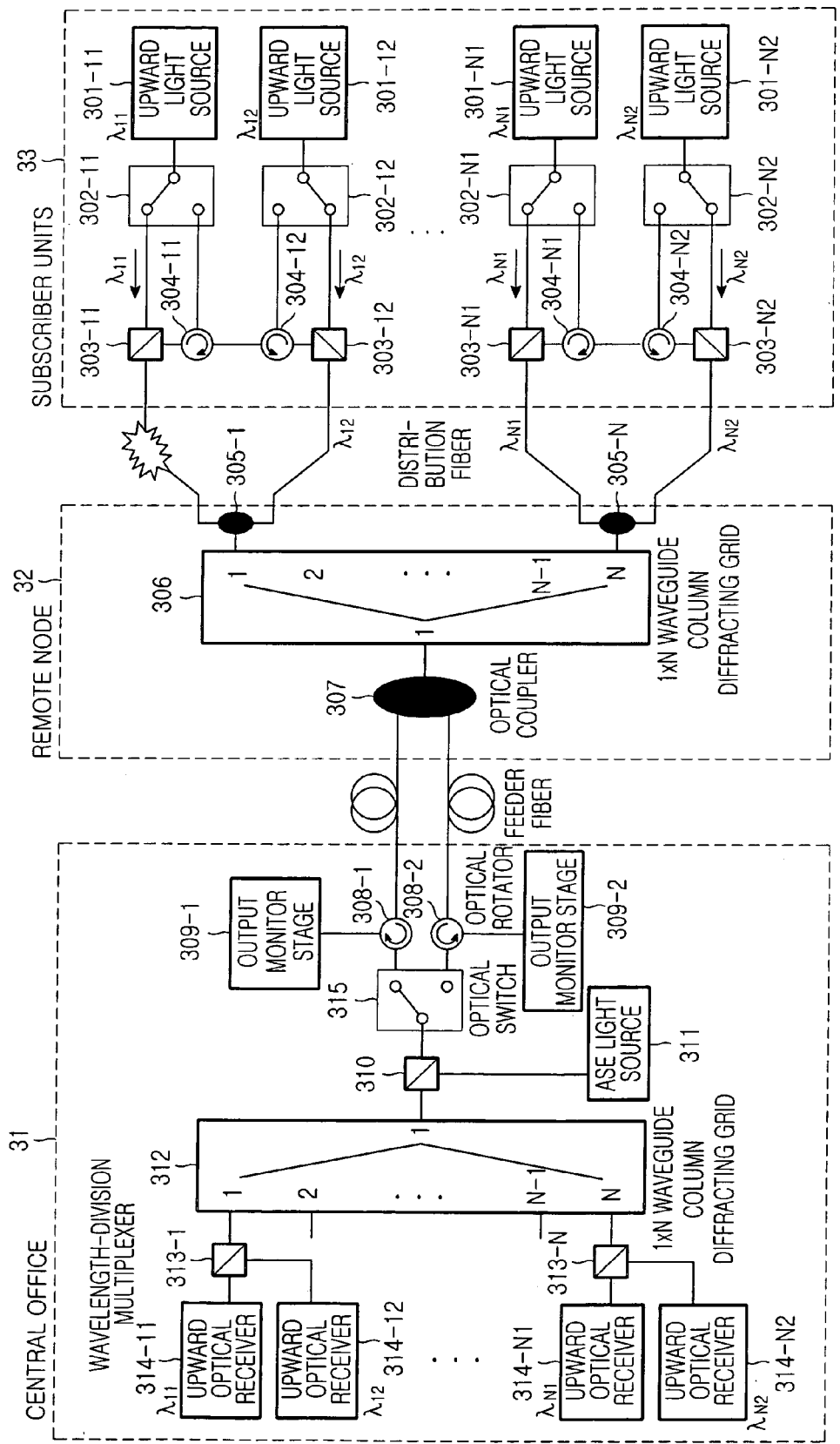
FIG. 9 is a view illustrating a second embodiment of self-healing in the upstream signal transmission of the wavelength-division multiplexed self-healing passive optical network in accordance with the present invention.

As shown in FIG. 9, two groups of upstream light sources ($\lambda i1$, $\lambda i2$), which are separated from each other by the free spectral range of the 1×N demultiplexer 312 of the central office 21 and are allocated to respective ones of subscriber units 33, are transmitted to the remote node 32 via the working distribution fiber in the normal state. At the remote node 32, the incoming optical signals are multiplexed into one optical signal in the N×1 multiplexer 306 of the remote node 32, and are transmitted via the optical coupler 307 to the working feeder fiber and the protection feeder fiber. In the central office 31, the upstream optical signal is monitored by the output monitor stages 309-1, 309-2, and, based on such a monitoring, the optical switch 315 is controlled to allow the self-healing operation of the working feeder fiber and the protection feeder fiber.

As shown in FIG. 9 where abnormality of the distribution fiber is present, if a first distribution fiber (transmitting the upstream optical signal of $\lambda 11$) cuts off, a first subscriber unit 301-11 cannot transmit the upstream optical signal of $\lambda 11$ over its own distribution fiber. Therefore, since the photodiode (not shown in the figure) for power monitoring at the first subscriber unit cannot receive the ASE light source 311 for detecting the cut-off of the working distribution fiber from the central office 31, the first subscriber unit determines that abnormality of the working distribution fiber is present, and changes the state of the 1×2 optical switch 302-11. The $\lambda 11$ optical signal is accordingly transmitted to a second subscriber unit over the protection fiber connected between the first subscriber unit and the second subscriber unit. Specifically, the $\lambda 11$ optical signal is transmitted to the optical circulator 304-11 via the optical switch 302-11. The optical circulator 304-11 transmits this optical signal via the optical circulator 304-12 of the second subscriber unit to the wavelength-division multiplexer 303-12 of the second subscriber unit. The wavelength-division multiplexer 303-12 multiplexes the $\lambda 12$ optical signal, e.g, the upstream signal of the second subscriber unit, into one optical signal ($\lambda 11$, $\lambda 12$) to be transmitted via the distribution fiber of the second subscriber unit to the remote node 32. In this way, the $\lambda 11$ optical signal of the first subscriber unit can be protected.

As apparent from the above description, in accordance with the present invention, by providing the working and protection feeder fibers between the central office and the remote node and the protection distribution fiber connecting two subscriber units to each other, the wavelength-division passive optical network can self-heal simply and at a lower cost.

In addition, in accordance with the present invention, by accommodating 2N subscriber units using the 1×N arrayed waveguide grating multiplexer for the central office and the remote node, respectively, the subscription capacity of the optical network can be enlarged.

In addition, in accordance with the present invention, distribution between the remote node and the subscriber is protected, by connecting, pair-wise, adjacent subscriber units with another protection fiber. As a result, the length and number of the fibers can be reduced, which contributes to reduction of a construction cost for the optical network.

Although the preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments and drawings.

What is claimed is:

1. A wavelength-division multiplexed passive optical network including a plurality of subscriber units, a central office having an end connected to a remote node, and said remote node having an end connected to said end of the central office, said network comprising:

a composite feeder fiber, comprising a working feeder fiber and a protection feeder fiber, for connecting the central office to the remote node;

a reflection unit provided said end of the remote node connected to the central office for reflecting a monitoring optical signal transmitted from the central office;

an output monitor stage provided at said end of the central office connected to the remote node for detecting the reflected monitoring optical signal and generating a control signal based on the presence of abnormality in said composite feeder fiber; and a first optical switch for switching the working and protection feeder fibers based on said control signal wherein the output monitor stage is provided on the working and protection feeder fibers and the output monitor stage includes:

an output monitor unit for detecting the presence of the monitoring optical signal branched and transmitted from one of the working and protection feeder fibers and transmitting the control signal based on the presence of the abnormality in said composite feeder fiber; and a first optical circulator for transmitting the monitoring optical signal to the output monitor unit, and transmitting said multiplexed 2N downstream optical signals to said composite feeder fiber.

2. The wavelength-division multiplexed passive optical network as set forth in claim 1, wherein the central office includes:

N first wavelength-division multiplexers each for coupling two optical signals of two respective groups of downstream optical signals;

a 1×N multiplexer for multiplexing 2N downstream optical signals output from the N first wavelength-division multiplexers;

a monitoring light source for generating the monitoring optical signal to monitor the abnormality of the working and protection feeder fiber; and a second wavelength-division multiplexer for coupling the monitoring optical signal with one of said multiplexed 2N downstream optical signals.

3. The wavelength-division multiplexed passive optical network as set forth in claim 2, wherein the 1×N multiplexer located in the central office comprises arrayed waveguide gratings.

4. The wavelength-division multiplexed passive optical network as set forth in claim 1, wherein the remote node includes:

a first optical coupler for coupling the working feeder fiber with the protection feeder fiber;

a 1×N de-multiplexer for de-multiplexing the multiplexed downstream optical signals transmitted from the central office; and N second optical couplers for using distribution fibers in coupling the 1×N de-multiplexer to the plural subscriber units, the plural subscriber units amounting to 2N subscriber units, wherein the reflection unit for reflecting the monitoring optical signal transmitted from the central office is provided between the first optical coupler and the 1×N de-multiplexer.

5. The wavelength-division multiplexed passive optical network as set forth in claim 4, wherein the 1×N de-multiplexer located in the remote node comprises arrayed waveguide gratings.

6. The wavelength-division multiplexed passive optical network as set forth in claim 4, wherein a subscriber unit of the plurality includes:

a downstream optical receiver for receiving downstream data having an allocated wavelength;

a first wavelength-division de-multiplexer for branching two optical signals having different wavelengths allocated respectively to two adjacent subscriber units connected to each other by a protection fiber;

a second optical circulator connected between said protection fiber and the first wavelength-division de-multiplexer; and a second optical switch connected to the downstream optical receiver, the first wavelength-division de-multiplexer and the second optical circulator for healing abnormality in ones of the distribution fibers.

7. The wavelength-division multiplexed passive optical network as set forth in claim 6, wherein the distribution-fiber abnormality is detected based on whether said downstream optical receiver receives an optical signal.

8. The wavelength-division multiplexed passive optical network as set forth in claim 7, wherein when said distribution-fiber abnormality is detected, said second optical switch is switched such that communication is established through an adjacent subscriber unit connected by said protection fiber to said subscriber unit of the plurality.

9. A wavelength-division multiplexed passive optical network including a plurality of subscriber units, a central office having an end connected to a remote node, and said remote node having an end connected to said end of the central office, said network comprising:

a composite feeder fiber, comprising a working feeder fiber and a protection feeder fiber, for connecting the central office to the remote node; and a first optical switch for switching the working and protection feeder fibers, wherein the plurality of subscriber units includes:

an upstream light source for transmitting upstream data;

a first wavelength-division multiplexer for coupling an upstream optical signal from a subscriber unit of the plurality with an optical signal from an adjacent one of the plural subscriber units, said adjacent one being connected by a protection distribution fiber to said subscriber unit of the plurality;

a first optical circulator for transmitting, via the protection distribution fiber, the upstream optical signal to said adjacent one and transmitting upstream an optical signal of said adjacent one transmitted via the protection distribution fiber to the first wavelength-division multiplexer; and a second optical switch for switching such that the upstream light source is connected to the first optical circulator, for rotation of light from said upstream light source, when abnormality of the upstream optical signal of the subscriber unit is detected.

10. The wavelength-division multiplexed passive optical network as set forth in claim 9, wherein the output monitor stage is provided on the working and protection feeder fibers, and wherein the output monitor stage includes:

an output monitor unit for detecting the presence of an optical signal branched and transmitted from each of the working and protection feeder fibers and transmitting the generated control signal; and a first optical coupler for transmitting the branched optical signal to the output monitor unit and transmitting from the output monitor unit the control signal internally within the central office.

11. The wavelength-division multiplexed passive optical network as set forth in claim 9, wherein the remote node includes:

a first optical coupler for coupling the working feeder fiber with the protection feeder fiber;

a 1×N multiplexer for multiplexing the upstream optical signals transmitted from the plural subscriber units; and N second optical couplers configured for pair-wise coupling of upstream optical signals of adjacent subscriber units of the plurality.

12. The wavelength-division multiplexed passive optical network as set forth in claim 11, wherein the 1×N multiplexer located in the remote node comprises arrayed waveguide gratings.

13. The wavelength-division multiplexed passive optical network as set forth in claim 11, wherein the central office includes:

a wideband light source for monitoring the presence of abnormality of working distribution fibers;

a second wavelength-division multiplexer configured for coupling the monitoring optical signal with the multiplexed optical signal;

a 1×N de-multiplexer for de-multiplexing the multiplexed upstream optical signals transmitted from the plurality of the subscriber units through the remote node, said plurality amounting to 2N subscriber units;

N wavelength-division demultiplexers each for separating upstream optical signals of two adjacent ones of the plural subscriber units; and two groups of upstream optical receivers connected to the N wavelength-division demultiplexers, for receiving upstream data from the plurality of subscriber units, the received upstream data being separated in the N wavelength-division demultiplexers.

14. The wavelength-division multiplexed passive optical network as set forth in claim 13, wherein an erbium-doped fiber amplifier is used as the wideband light source located in the central office.

15. The wavelength-division multiplexed passive optical network as set forth in claim 13, wherein a semiconductor optical amplifier is used as the wideband light source located in the central office.

16. The wavelength-division multiplexed passive optical network as set forth in claim 13, wherein a light emitting diode is used as the wideband light source located in the central office.

17. The wavelength-division multiplexed passive optical network as set forth in claim 13, wherein a superluminescent light emitting diode is used as the wideband light source located in the central office.

18. The wavelength-division multiplexed passive optical network as set forth in claim 13, wherein the 1×N demultiplexer located in the central office comprises arrayed waveguide gratings.

19. The wavelength-division multiplexed passive optical network as set forth in claim 9, wherein said abnormality of the upstream optical signal is detected based on the presence of output of a wideband light source input to a subscriber unit whose connection with the remote node is directly affected by the abnormality.

20. The wavelength-division multiplexed passive optical network as set forth in claim 9, wherein when said abnormality of the upstream optical signal is detected, the second optical switch located at the subscriber unit directly affected by the abnormality is switched such that communication is established by the protection distribution fiber through an adjacent subscriber unit connected to said subscriber unit directly affected.

* * * * *